US007005962B2

(12) United States Patent
Sundqvist et al.

(10) Patent No.: US 7,005,962 B2
(45) Date of Patent: Feb. 28, 2006

(54) PRICE LABEL COMMUNICATION SYSTEM

(75) Inventors: David Sundqvist, Knivsta (SE); Tomas Johansson, Uppsala (SE)

(73) Assignee: Pricer AB, Sollentuna (SE)

( * ) Notice: Subject to any disclaimer, the term of this patent is extended or adjusted under 35 U.S.C. 154(b) by 216 days.

(21) Appl. No.: 10/332,347

(22) PCT Filed: Jul. 6, 2001

(86) PCT No.: PCT/SE01/01562

§ 371 (c)(1),
(2), (4) Date: Jun. 26, 2003

(87) PCT Pub. No.: WO02/05058

PCT Pub. Date: Jan. 17, 2002

(65) Prior Publication Data
US 2004/0012196 A1 Jan. 22, 2004

(30) Foreign Application Priority Data
Jul. 7, 2000 (SE) .................................. 0002573

(51) Int. Cl.
*H04Q 1/00* (2006.01)
(52) U.S. Cl. ........................ 340/5.91; 705/20; 235/383

(58) Field of Classification Search ............... 340/5.91, 340/10.41; 705/20; 345/1.1, 2.1; 235/383; 455/67.13, 501; 283/81
See application file for complete search history.

(56) References Cited

U.S. PATENT DOCUMENTS

| 5,235,326 A | * | 8/1993 | Beigel et al. ............. 340/10.41 |
| 5,257,369 A | | 10/1993 | Skeen et al. |
| 5,384,842 A | | 1/1995 | Tapping et al. |
| 5,401,947 A | * | 3/1995 | Poland ........................ 235/383 |
| 5,537,126 A | * | 7/1996 | Kayser et al. ............... 345/2.1 |
| 5,632,010 A | * | 5/1997 | Briechle et al. ............. 345/1.1 |
| 5,704,049 A | | 12/1997 | Briechle |
| 5,722,048 A | * | 2/1998 | Javitt ......................... 455/501 |
| 5,977,998 A | | 11/1999 | Briechle et al. |
| 6,055,414 A | * | 4/2000 | Javitt ....................... 455/67.13 |
| 2004/0012485 A1 | * | 1/2004 | Sundqvist .................. 340/5.91 |

FOREIGN PATENT DOCUMENTS

| EP | 0 994 431 A2 | 4/2000 |
| GB | 2 327 829 A | 2/1999 |
| WO | 00/22768 | 4/2000 |

* cited by examiner

Primary Examiner—Edwin C. Holloway, III
(74) Attorney, Agent, or Firm—Young & Thompson

(57) ABSTRACT

Price label system comprising a price label system server connected to transceivers adapted to communicate price label information to price labels using a communication protocol. A predetermined number of transceivers defines a sub-cell and each sub-cell is associated with a communication profile that defines communication protocols to be used when communicating with the price labels in that sub-cell.

8 Claims, 4 Drawing Sheets

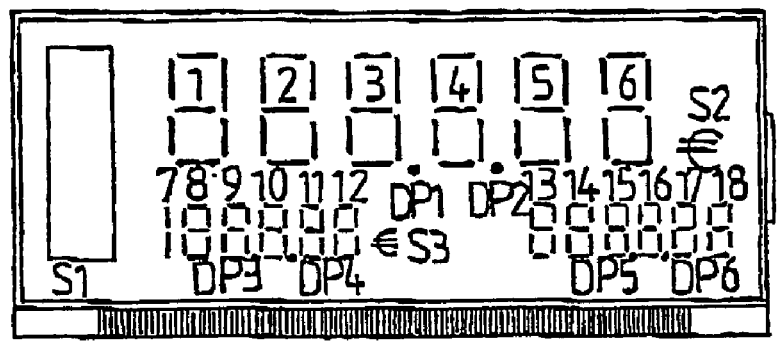
FIG. 3a
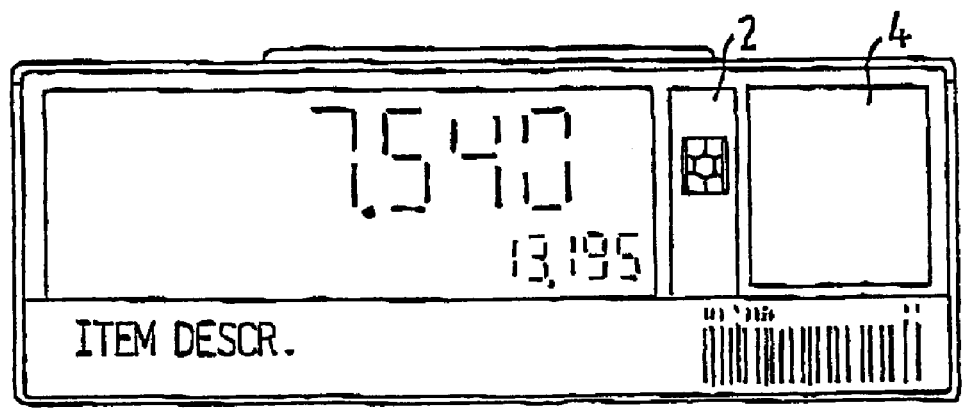
FIG. 3b
| Family | Revision | Protocol |
|--------|----------|----------|
| PP4B | 1 | PP4B_ProtocolC |
| PP4B | 2 | PP4B_ProtocolCC |
| --- | | |
FIG. 4

Profile 1
| Family | Revision | Protocol |
|---|---|---|
| PP4B | 1 | PP4B_ProtocolC |
| PP4B | 2 | PP4B_ProtocolCC |
| PP4C | 1 | PP4B_ProtocolCC |
Profile 2
| Family | Revision | Protocol |
|---|---|---|
| PP4B | 1 | PP4B_ProtocolC |
| PP4B | 2 | PP4B_PrptocolCC |
| PP4C | 1 | PP4C_PrptocolC3 |
FIG. 5
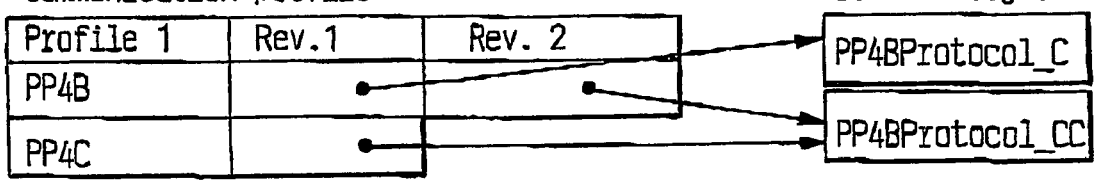
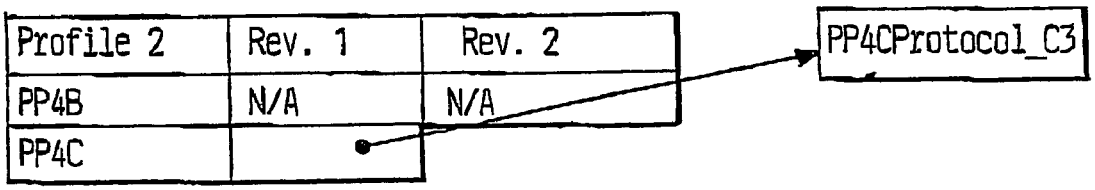
FIG. 6

PRICE LABEL COMMUNICATION SYSTEM

FIELD OF THE INVENTION

The present invention relates to a price label system and a method in a price label system according to the preambles of the independent claims.

BACKGROUND OF THE INVENTION

The price label system according to the present invention is generally an electronic pricing and information system that replaces the old paper labels with electronic labels where the process on labels can be wirelessly changed from a computer.

The actual price changes are not done in the price label system, but in the store's Price Controlling Application (PCA) system. The PCA contains a database which stores all the information about the items in the store, e.g. product name, package size, and the current price. The store's cash registers are connected to the PCA system, and thus always have the correct price information. The PCA can e.g. be the store's back-office computer system. There are no limitations regarding host computers for the PCA and the price label system server. They may be run on the same computer or in two (or more) different computers.

The PCA system controls the actual price of an item and provides the price label system according to the invention with updating information whenever the price is hanged. The PCA system interacts with the price label system to supply information to the price labels (PLs). This is normally performed via a Price File Interface (PFI) that is a software-to software interface connecting the PCA system to the price label system server. The only prerequisite is that all PFI files (see below) are reachable (can be read and written) within any path of a mounted drive or file system known to the computer where the PFI service is executing. The transportation mechanisms through the PFI are e.g. common text files, e.g. in 8-bit ASCII format or 2-byte UNICODE. Other transportation mechanisms are naturally possible. The price label system automatically detects the format of the input files. Two PFI files are created by the PCA, a message file and a data file.

The price label system creates a third PFI file, a result file that is retrieved by the PCA.

The message file contains one or my commands to the price label, e.g. a target link command used to establish the connection between an item and a label and an update command used to change the information an the label, e.g. the price. The data file contains data such as prices, item identity and label identity and the result file contains the results from executed commands.

The price label system generally comprises software installed in a server computer, a hardware infrastructure and price labels. The hardware infrastructure comprises base stations, transceivers and cables. The price labels are mounted with their items in the store, e.g. on the shelf-edges. Transceivers are normally mounted in the ceiling and base stations normally on a wall. A predetermined number of transceivers are connected to a base station, which is connected to the price label system server, preferably via a hub. The price label server is connected to the PCA, often via the same network.

FIG. 1 schematically illustrates an overview of the PCA and the price label system briefly described above and in accordance with well-established technique where the present invention is applicable.

When a price is changed in the PCA system, the information is sent to the price label system server (PLS server). From the PLS server, designated as "serve" in FIG. 1, the information is sent via a hub and base stations BS to transceivers in the ceiling where it is transformed into infrared signals. When the electronic price labels receive the infrared signals the price is immediately updated.

Each electronic price label acknowledges the updated price by transmitting a feedback pulse to the transceivers. The feedback pulse is returned to the server and stored in a database to verify that the transmission was OK.

Although the system shown in FIG. 1 uses infrared signals when communicating with the price label it should be noted that the present invention is equally applicable for any type of communication signal used between the price label system and the price labels.

Among different types of communication signal applicable in the system can be mentioned radio wave signals, optical signals, electrical signals.

A cell is defined as the set of transceivers connected to the same base station. A sub-cell is defined as each set of simultaneously transmitting transceivers. All transceivers within a sub-cell simultaneously transmit the same date. A power supply energizes the transmitting transceivers.

FIG. 2 illustrates an example of an installation plan with one cell comprising three sub-cells, SC1, SC2 and SC3, respectively. Each sub-cell includes a number of transceivers TRX. When configuring cells and sub-cells many different things must be considered. Among those can be mentioned that cables to transceivers within one sub-cell must be of sir lengths in order to minimize phase shifts and that sub-cells should overlap in order to ensure signals of sufficient strengths to all labels.

A benefit of the sub-cell concept is that it is possible to keep track of price label locations and that a label that does not respond can be paged (searched for).

A price label (PL) is an electronic device provided with an LCD display with the shape and size of a regular shelf-edge price label. Each PL has a unique address and is logically connected to a sales item in the store. Normally the PL displays an item's price. FIG. 3a shows a typical price label where all fields are active and FIG. 3b shows a price label displaying normal price and normal unit price. A sender and transmitter part 2 and a small solar cell 4 can also be seen on the price label in FIG. 3b. A battery, or a combination of battery and solar cell, provides the power for the PL.

There exists many different kinds of price labels, they can e.g. differ in size, in number of price fields or other fields. The word "price" is used throughout the application to define what is displayed on the price label. It should however be noted that although the price label often displays price information it is naturally possible to display other type of information on the price labels, solely or in addition to price information, without departing from the scope of the present invention. This other type of information may for example be text, figures or images.

The labels can also differ in the way the price label system needs to handle them, e.g. with regard to used communication protocol, and if the circuitry inside the price label has been changed.

The communication between the price label server and a price label is inter alia determined by the value of two parameters: price label family (PL family) and price label family revision (PL family revision).

The PL family is an administrative or logical entity that is used to group price labels together with similar communication features.

The PL family revision is used to denote minor differences in the values of the protocol parameters. A PL family may comprise several PL family revisions. To each physical price label is associated a PL type that encompasses the PL family and the PL family revision.

The communication protocol parameters are collected in protocol objects in the price label server. In a normally configured price label system typically includes a number of such protocol objects to be used when communicating with different kinds of price labels.

A protocol object comprises e.g. parameter settings regarding the number of re-transmissions, re-calibration time, and physical protocol identity.

When the server is about to communicate with a specific price label it needs to determine what protocol object to use.

According to a presently used system a specific price label type (with specific values of family and revision) is mapped to a specific protocol. FIG. 4 schematically illustrates this. In this case the communication between all physical price labels of the same PL type and the server is always performed in the same way, detained by the protocol objects settings.

However, in certain situations, e.g. due to environmental circumstances, if the price label is located in a noisy environment or due to constraints regarding infrastructure components, the used protocol is not always optimal for a specific situation which sometimes may lower the performance of the system.

Constraints regarding infrastructure components may e.g. occur when a new type of transceiver supporting a new IR protocol is introduced. A physical FL type may support both the new IR protocol and au older one. Which one to be used is determined by the transceiver type.

The object of the present invention is to achieve a system where an optimal performance of the system is achieved.

SUMMARY OF THE INVENTION

The above-mentioned object is achieved by a system and a method according to the characterizing parts of the independent claims.

Preferred embodiments are set forth in the dependent claims.

Thus, by using a price label communication profile specially adapted for a specific sub-cell where communication protocol settings are defined based upon price label types of price labels in that sub-cell and of different circumstances related to that specific sub-cell, optimal performance is achieved for the price label system.

The present invention makes it possible to selectively specify protocol setting for different physical locations in a store (e.g. different departments) and also for different types of infrastructure.

SHORT DESCRIPTION OF THE APPENDED DRAWINGS

FIGS. 3a and 3b shows typical price labels used by the system according to the invention.

FIG. 4 shows communication protocols presently used.

FIG. 5 shows communication protocols according to a preferred embodiment of the invention.

FIG. 6 illustrates an implementation of a preferred embodiment of the invention.

DETAILED DESCRIPTION OF PREFERRED EMBODIMENTS OF THE INVENTION

FIG. 5 illustrates an example of a preferred embodiment of the invention where two different communication profiles are arranged. The two profiles differ in that in profile 1 is "Family PP4C, revision 1" mapped to protocol "PP4B_ProtocolCC" whereas in profile 2 it is mapped to protocol "PP4C_ProtocolC3".

When a transmission to a price label is to be performed the communication profile for the sub-cell where the price label is located is identified. The price label type, comprising inter alia price label family and price label family revision, of the physical price label is then identified in the profile where it is, together with other parameters, mapped to a communication protocol applicable for exactly his physical price label in this sub-cell.

When assigning a communication profile to a specific sub-cell many different matters must be taken into account. Among those can be mentioned environmental circumstances, i.e. if the price label is located in a noisy environment where reflections and lighting conditions interfere with the transmission between the transceivers and price labels. Also constraints regarding infrastructure components may influence the choice of communication profile. These different circumstances and the PL types of the price labels of that sub-cell are weighted together when determining which communication profile to use in a specific sub-cell.

In a sub-cell having a more disturbed environment the communication profile may e.g. be arranged to use a communication protocol where a higher number of re-transmissions are used compared to a normal sub-cells.

According to a preferred embodiment of the invention is the different communication profiles set up, configured and assigned to sub-cells at run-time through a system management graphical user interface (GUI) that is a part of the price label system, or preset at installation time.

FIG. 6 illustrates an implementation of a preferred embodiment of the invention. Two communication profiles, profile 1 and profile 2, is illustrated. Each communication protocol object, above referred as communication protocol, is implemented as an instance of a protocol class wit properties corresponding to the different communication parameters.

Each communication profile includes a mapping from price label and other properties to a protocol object as illustrated in FIG. 6.

Figure 1:
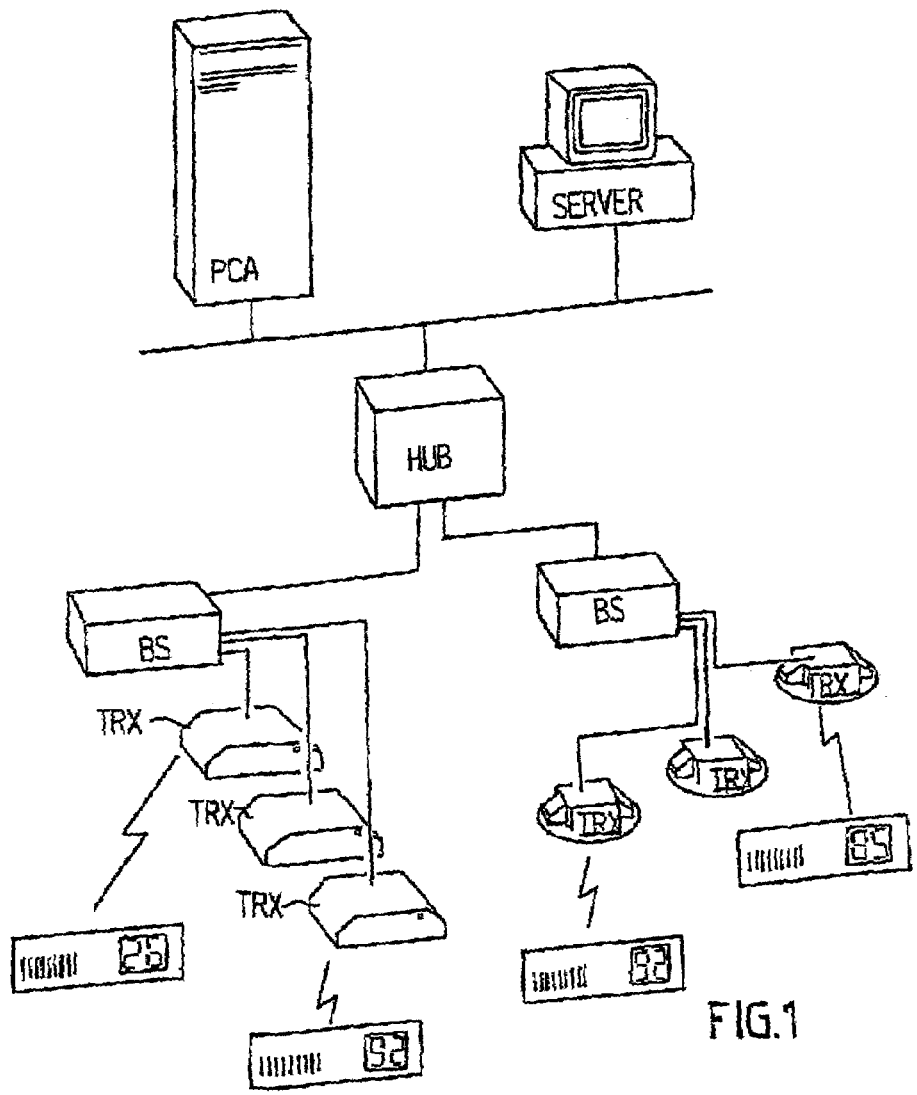
FIG. 1 is a schematic illustration of a price controlling application system and a price label system according to well-established technique where the present invention is applicable.
Figure 2:
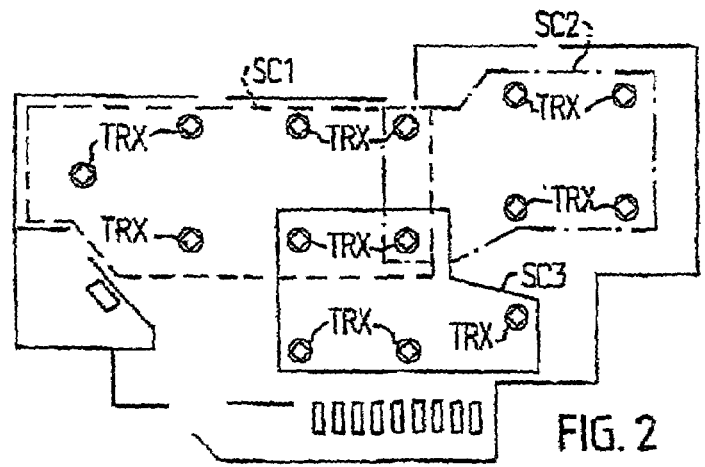
FIG. 2 illustrates an example of an installation plan for transceivers.
Figure 7:
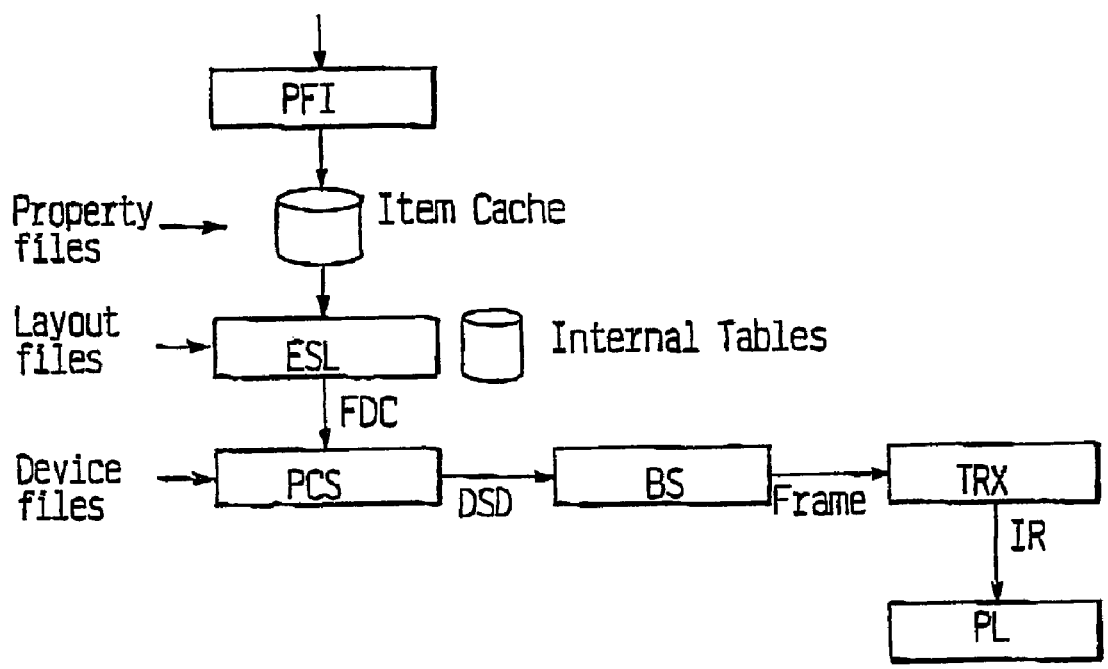
FIG. 7 shows the main blocks of the price label system according to the present invention.

FIG. 7 shows the main blocks of the price label system according to the present invention.

The system comprises a price file interface (PF) where data, e.g. new price of an item, is received in the form of a PFI data file from the store's PCA-system (not shown in the figure). The received data is stored in an item cache database and a request to create an update job is generated. A property description file contains item data and information how the data should be viewed in a graphical user interface (GUI) in a client (not shown in the figure) connected to the server. The request for updating a PL is applied to the "electronic shelf edge label" management block (ESL) that handles the connection between item and price label by accessing item and label information from the item cache database and also from internal tables in the ESL-block. To determine which information to send out to an individual PL, the PL's associated PL layout script file is executed based on information in the associated PL model, using the IPF to select the appropriate layout script. The layout script files describe how to map item data onto the price label. There are a number of layout script files for each PL type. When the layout script is executed, the output from the layout script is transformed into a format called "field data contents" (FDC) containing the data to send.

The FDCs are collected in a batch in the "price communication service" (PCS) blocks. The PCS block converts, by using "device files" and by using the settings in an associated communication protocol, the FDC data to frames which are collected into a "device specific data" (DSD) that in turn is transferred to a sending queue. The "device files" define how to display the data on the label. There is one device file for each PL type. The PL product representing the physical PL associates the layout and the PL type.

DSDs from the sending queue are then transmitted to the basestation (BS) and further in the form of data frames via the transceivers& (TRX) sent by IR light to the price labels (PLs).

Below is an overview of the price changing process in a price label system according to a preferred embodiment of the present invention:
1. The price label system server from the store's PCA-system receives a price file containing item number and the new information, e.g. price.
2. Look up the item in a database and get the identity of all price labels (PLs) connected to this item.
3. Get the PL model to be used. Either as a specified property on the PL or else use the default model for that PL type. The PL model contains information about layout scripts to use for different Item Presentation Forms (see below).
4. Determine which layout script to use based on the IF for the item. Item Presentation Form (IPF) is an abstraction of what information to display on a PL for an Item.
5. Execute the layout scripts, and perform all the steps needed to generate the data frame that is to be transmitted to the target PL.
6. Determine in which sub-cell the PL is located. This could be either the sub-cell where a price label acknowledge last was received or the sub-cell initiated by the PCA-system. In this determined sub-cell the frame containing e.g. price information will be transmitted.
7. Fetch the communication settings from the communication protocol object associated with the determined sub-cell. This is determined through the communication profile of that sub-cell.
8. Transmit the frame to a base-station and further to the transceivers in the determined sub-cell for communication to the price label(s) using the communication parameters specified in the protocol object.

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. Price label system comprising:
a price label system server connected to transceivers adapted to communicate price label information to price labels using a communication protocol, wherein a predetermined number of transceivers defines a sub-cell, each sub-cell is associated with a communication profile that defines communication protocols to be used when communicating with the price labels in that sub-cell, said communication profile is determined by price label categories related to price labels of that sub-cell and by one or many characteristic(s) of that sub-cell, and one of said characteristics is related to the environmental conditions for the price labels of that sub-cell.

2. Price label system according to claim 1, characterized in that one of said circumstances is related to constraints regarding infrastructure components.

3. Price label system according to claim 1, characterized in that each price label is associated to a price label type.

4. Price label system according to claim 1, characterized in that said communication profile comprises price label families and price label family revisions.

5. Price label system according to claim 4, characterized in that a price label family and a price label family revision is mapped to a communication protocol.

6. Method in a price label system according to claim 1, characterized in that the method comprises the following steps:
initiate a change of information displayed by a price label arranged in a sub-cell,
use the communication profile associated to that sub-cell and
apply the communication protocol defined by said communication profile when communicating with said price label, wherein said communication profile is determined by price label characteristics related to price labels of that sub-cell and by one or many circumstance(s) of that sub-cell including at least environmental conditions.

7. Price label system according to claim 1, wherein said environmental conditions include reflections and lighting conditions.

8. Method of claim 6, wherein said environmental conditions include reflections and lighting conditions.

* * * * *